United States Patent Office 3,101,347
Patented Aug. 20, 1963

3,101,347
2,3-DIHYDROXY-CYCLODODEC-1-ENE-1-CAR-
BOXYLIC ACID-γ-LACTONE
Pierre Lafont, Lyon, Rhone, and Yannik Bonnet, Tassin-
la-Demi-Lune, Rhone, France, assignors to Rhone-
Poulenc S.A., Paris, France, a French body corporate
No Drawing. Filed Jan. 18, 1962, Ser. No. 167,172
Claims priority, application France Jan. 20, 1961
1 Claim. (Cl. 260—343.3)

This invention relates to a new lactone and its alkali metal derivatives, a process for their preparation and pharmaceutical compositions containing them.

According to the present invention, there are provided the hitherto unknown γ-lactone of 2,3-dihydroxy-cyclodo-dec-1-ene-1-carboxylic acid which exists in the tautomeric forms represented by the formulae:

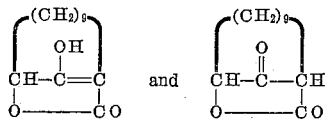

and its alkali metal derivatives.

According to a feature of the invention, the aforesaid new lactone and its alkali metal derivatives are prepared by the process which comprises heating an alkyl 2-oxo-cyclododecane-1-carboxylate halogenated in the 1- or 3-position (preferably by a bromine atom) with an acid or a mixture of acids capable of converting a β-oxo-carboxyl-ic acid ester substituted in the 1- or 3-position by a halogen atom to an ethylenically unsaturated γ-lactone, and optionally converting the lactone thus obtained into an alkali metal derivative. As appropriate acid reactants there may be used strong mineral acids such as dilute aqueous hydrochloric and sulphuric acids, for example hydrochloric acid of density 1.05 to 1.16 (at 20° C.) or sulphuric acid of density 1.25 to 1.70 (at 20° C.), strong organic acids such as toluene-p-sulphonic acid, or associations of strong and weak organic acids such as a mixture of glacial acetic acid and toluene-p-sulphonic acid. In addition, associations of organic acids with their alkali metal salts, for example, a mixture of glacial acetic acid and anhydrous sodium acetate, may be used.

The acids or acid containing mixtures form the reaction medium and it is advantageous to employ them in at least double the volume of the halogenated 2-oxo-cyclododecane ester. ˜In the case of mixtures of acid and its salt, e.g. acetic acid-sodium acetate, the theoretically necessary quantity of the acetate or an excess up to 200% compared with the halogenated 2-oxo-ester is preferably used and acetic acid added until solution is complete to obtain a concentrated solution of the acetate. In the case of mixtures of acetic acid and toluene-p-sulphonic acid, good yields of the new lactone may be obtained with only small quantities of toluene-p-sulphonic acid, and such quantities may be catalytic in effect.

The reaction is carried out by heating the mixture of alkyl halogeno-2-oxo-cyclododecane-1-carboxylate and acid compound or compounds preferably at the reflux temperature, for example between 80° and 150° C. for several hours. When the reaction is carried out in the presence of dilute mineral acids, a slight decarboxylation of the cyclic halogeno-2-oxo-ester may occur and, after extraction of the reaction product with diethyl ether and separating the lactone of the invention, there may be isolated a small neutral fraction consisting essentially of 2-halogeno-cyclododecanone. If associations of the type (a) glacial acetic acid-toluene-p-sulphonic acid or (b) glacial acetic acid-anhydrous sodium acetate, are used as the acid reactant, a precipitate of the γ-lactone of 2,3-dihydroxy-cyclododec-1-ene-1-carboxylic acid in a yield above 80% is obtained directly after removal of acetic acid by evaporation in vacuo.

The γ-lactone of 2,3-dihydroxy-cyclododec-1-ene-1-carboxylic acid may be converted into an alkali metal derivative in manner known per se, for example by treating the acid with the stoichiometric quantity of an alkali metal hydroxide. The alkali metal derivatives are water-soluble.

The alkyl halogeno-2-oxo-cyclododecane-1-carboxylates employed as starting materials in the aforementioned process are readily obtained by the action of an alkyl carbonate on sodio-cyclododecanone followed by halogenation (preferably bromination) at ordinary temperature in a solvent inert to halogen, for example, diethyl ether, benzene or chloroform, and only using the theoretically necessary quantity of halogen. When the production solely of an alkyl 2-oxo-cyclododecane-1-carboxylate brominated in the 1-position is required, the compound must be isolated rapidly from the reaction medium since otherwise it isomerises to the alkyl 3-bromo-2-oxo-cyclododecane-1-carboxylate under the catalytic activity of the gaseous hydrogen bromide formed during the course of the reaction. The proportion of product brominated in the 3-position is greater when the time and temperature of contact with the hydrogen bromide is greater. When a mixture of isomeric brominated cyclododecane-carboxylates is obtained, they may be separated by treating the mixture in manner known per se, in particular by fractional crystallisation. Separation is not, however, essential since both isomers give on treatment with acids according to the aforesaid process γ-lactone of 2,3-dihydroxy-cyclododec-1-ene-1-carboxylic acid.

The lactone of the present invention and its alkali metal derivatives possess useful chloreretic activity and can be used therapeutically for the treatment of dyspeptic states, slow digestion, hepatic insufficiency and hepatic congestion, and also as adjuvants to bile opacifying agents.

The following examples illustrate the invention.

*Example I*

(a) Ethyl 1 - bromo-2-oxo-cyclodecane-1-carboxylate (13.5 g.) and hydrochloric acid (d=1.11; 40 cc.) are placed in a 250 cc. flask fitted with a reflux condenser and a wash-bottle containing baryta water and heated at the reflux temperature of the mixture (about 107° C.). After heating for several minutes a slow evolution of carbon dioxide is observed and heating is continued at reflux temperature for fifteen hours. After cooling, a crystalline product is obtained in suspension in an oil. After extraction with diethyl ether, the ethereal layer is washed twice with sodium bicarbonate solution to extract the acid product. The ether fraction is dried over anhydrous sodium sulphate and the ether evaporated. A neutral fraction (2 g.) is recovered consisting essentially of 2-bromo-cyclododecanone, B.P. 90–97° C./0.20 mm. Hg. The acid product is dissolved in sodium bicarbonate solution and the solution washed with diethyl ether and acidified by the addition of dilute hydrochloric acid. The acid product (7.5 g.) is thus precipitated, M.P. 174–175° C. after recrystallisation from a methanol/benzene mixture.

Elemental analysis of the pure product and its examination by infra-red and ultra-violet spectroscopy show that it is the γ-lactone of 2,3-dihydroxy-cyclododec-1-ene-1-carboxylic acid.

(b) Proceeding exactly under the conditions described in (a), but commencing with ethyl 3-bromo-2-oxo-cyclo-dodecane-1-carboxylate (31 g.) and hydrochloric acid (d=1.11; 100 cc.), a neutral fraction (8 g.) is obtained yielding 2-bromo-cyclododecanone (5.15 g.) and an acid product (12 g.), M.P. 174° C. identical with that previously isolated starting with ethyl 1-bromo-2-oxo-cyclododecane-1-carboxylate.

Example II (a) Anhydrous sodium acetate (8.2 g. or 0.1 mole) is dissolved in boiling glacial acetic acid (45 g.) in a 100 cc. flask fitted with a reflux condenser. Ethyl 3-bromo-2-oxo-cyclododecane-1-carboxylate (16.65 g. or 0.05 mole) is added in one portion and the reaction mass refluxed. After several hours of heating a precipitate of sodium bromide forms and refluxing is continued for about 30 hours. The acetic acid is then evaporated in vacuo and the residue thrown into water. The precipitate obtained gives, after filtration, an acid product (10.7 g.) which, after treatment with animal charcoal and recrystallisation from a methanol/benzene mixture, gives an acid compound (10.1 g.) identical with that obtained in Example I (yield 90%).

(b) Repeating the procedure described in (a) under the same conditions and with the same proportions of reactants but commencing with ethyl 1-bromo-2-oxo-cyclododecane-1-carboxylate, there is obtained after crystallisation a crude base (8.5 g.) from which pure $\gamma$-lactone of 2,3-dihydroxy-cyclododec-1-ene-1-carboxylic acid (8.1 g.), M.P. 175° C., is obtained.

Example III

Glacial acetic acid (100 cc.), toluene-p-sulphonic acid (200 mg.) and ethyl 1-bromo-2-oxo-cyclododecane-1-carboxylate (23.5 g.) are placed in a 250 cc. flask fitted with a reflux condenser and heated under reflux for 19 hours. The major part of the acetic acid is then evaporated in vacuo and the reaction mass thrown into water. A precipitate is obtained which, after dissolving in methanol, treating with animal charcoal, filtering over kieselguhr and evaporating the methanol, gives the $\gamma$-lactone of 2,3-dihydroxy-cyclododec-1-ene-1-carboxylic acid (12.8 g.; 81% yield), M.P. 175° C.

The present invention further includes within its scope pharmaceutical compositions which comprise the $\gamma$-lactone of 2,3-dihydroxy-cyclododec-1-ene-1-carboxylic acid or alkali metal derivative thereof together with a pharmaceutical carrier or coating. In clinical practice the compounds of the present invention will normally be administered orally or parenterally.

Solid compositions for oral administration include compressed tablets, pills, dispersible powders, and granules. In such solid compositions one or more of the active compounds is, or are, admixed with at least one inert diluent such as calcium carbonate, potato starch, sucrose, alginic acid, or lactose. The compositions may also comprise, as is normal practice, additional substances other than inert diluents, e.g. lubricating agents, such as magnesium stearate. Liquid compositions for oral administration include pharmaceutically acceptable emulsions, solutions, syrups and elixirs containing inert diluents commonly used in the art, such as water and liquid paraffin. Besides inert diluents such compositions may also comprise adjuvants, such as wetting and suspending agents, and sweetening, flavouring and preserving agents. The compositions according to the invention, for oral administration, also include capsules of absorbable material such as gelatin containing one or more of the active substances with or without the addition of diluents or excipients.

Preparations according to the invention for parenteral administration include sterile aqueous or non-aqueous solutions, suspensions, or emulsions. Examples of non-aqueous solvents or suspending media are propylene glycol, polyethylene glycol, vegetable oils such as olive oil, and injectable organic esters such as ethyl oleate. These compositions may also contain adjuvants such as preserving, wetting, emulsifying and dispersing agents. They may be sterilised by, for example, filtration through a bacteria-retaining filter, by incorporation in the compositions of sterilising agents, by irradiation, or by heating. They may also be manufactured in the form of sterile solid compositions, which can be dissolved in sterile water or some other sterile injectable medium immediately before use. Preferred formulations for parenteral administration are sterile aqueous solutions of alkali metal derivatives of the lactone.

The percentage of active ingredient in the compositions of the invention may be varied, it being necessary that it should constitute a proportion such that a suitable dosage for the therapeutic effect desired shall be obtained. Obviously several unit dosage forms may be administered at about the same time. In human therapy the compositions should be administered so as to give to an adult, in the case of oral administration, 0.1 to 2 g. of active substance per day (the dosage may be repeated for several e.g. 10 to 20, consecutive days) and, in the case of parenteral administration, 0.1 to 1 g. per day.

The following example illustrates pharmaceutical compositions according to the invention.

Example IV

Tablets (0.35 g.) are prepared containing:

| | G. |
|---|---|
| $\gamma$-Lactone of 2,3-dihydroxy-cyclododec-1-ene-1-carboxylic acid | 0.100 |
| Starch | 0.217 |
| Finely powdered silica | 0.030 |
| Magnesium stearate | 0.003 |

We claim:

A member of the class consisting of the $\gamma$-lactone of 2,3-dihydroxy-cyclododec-1-ene-1-carboxylic acid and its alkali metal derivatives.

References Cited in the file of this patent

Gaudry et al.: Jour. Amer. Chem. Soc., volume 76 (1954), pages 139–143.